UNITED STATES PATENT OFFICE 2,534,823

1-KETO-2-HYDROXYMETHYLENE-7-OR-1,2,3,4-TETRAHYDROPHENANTHRENES

William S. Johnson, Madison, Wis., Jack W. Petersen, Oakland, Calif., and Carl David Gutsche, St. Louis, Mo., assignors to Wisconsin Alumni Research Foundation, Madison, Wis., a corporation of Wisconsin No Drawing. Original application October 1, 1946, Serial No. 700,380. Divided and this application November 13, 1947, Serial No. 785,821

3 Claims. (Cl. 260—590)

The invention of this application is directed to the production of certain 1-keto-2-hydroxymethylene - 7 - OR - 1,2,3,4 - tetrahydrophenanthrenes, and to those compounds themselves; which are useful in the synthesis of steroids of the type in which both rings A and B are aromatic—and especially in the synthesis of equilenin—and are produced by the first step of that synthesis.

The complete synthesis of these steroids involves five steps; which, however, except as will be indicated, we believe to be individually new. The claims of the present application are directed specifically to the first step, and to the products obtained thereby; and the second, third, fourth, and fifth steps form the subject-matter of four separate applications, respectively. The present application is a division, as are three of said four companion applications, of the fourth of those companion applications; which is directed specifically to the fifth step of the synthesis, and which is Serial No. 700,380, filed October 1, 1946, and issued as Patent No. 2,527,999 on October 31, 1950. The filing of the divisional applications is in response to a requirement for division by the Patent Office, made in such parent application Serial No. 700,380, in which all five steps and their products were originally claimed.

Because the claims of the present application are limited to the first step of the complete synthesis, only that step will be described in full detail in this application; and the other four steps will be set forth only in the general description.

The five steps of the complete synthesis of the steroids are as follows:

a. 1 - keto - 7 - OR-1,2,3,4 - tetrahydrophenanthrene, in which R indicates a substituent in the class consisting of lower-alkyl groups and lower-aralkyl groups, desirably the methyl group, is condensed with a lower-alkyl formate, conveniently ethyl formate, in the presence of sodium methoxide, and desirably in an inert solvent, such as benzene for example; to produce 1 - keto - 2 - hydroxymethylene - 7 - OR - 1,2,3,4,- tetrahydrophenanthrene, as follows:

(1)
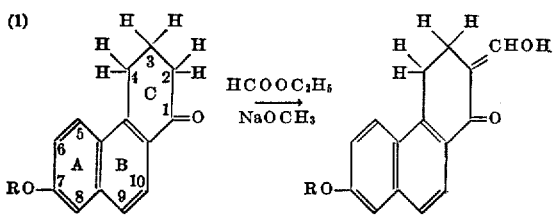

This product is new, and is the subject-matter of the present application.

b. 1 - keto - 2 - hydroxymethylene - 7 - OR-1,2,3,4-tetrahydrophenanthrene is treated with hydroxylamine, desirably as the hydrochloride dissolved in acetic acid; to produce 10,11-dihydro-7-OR-phenanthro[2,1-d]isoxazole, as follows:

(2)
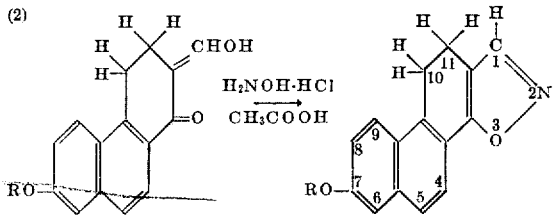

This product is new.

c. The 10,11 - dihydro - 7 - OR - phenanthro[2,1-d]isoxazole, desirably in an inert solvent, benzene for example, is treated with an alkali-metal alkoxide, conveniently sodium methoxide, followed by a methyl heavy-halide, preferably methyl iodide but permissibly methyl bromide; to produce (first) 2-cyano-1-keto-7-OR-2-sodio-1,2,3,4-tetrahydrophenanthrene, which is commonly not isolated, and (second) 2-cyano-1-keto - 7 - OR - 2 - methyl - 1,2,3,4 - tetrahydrophenanthrene, as follows:

(3)
(4)
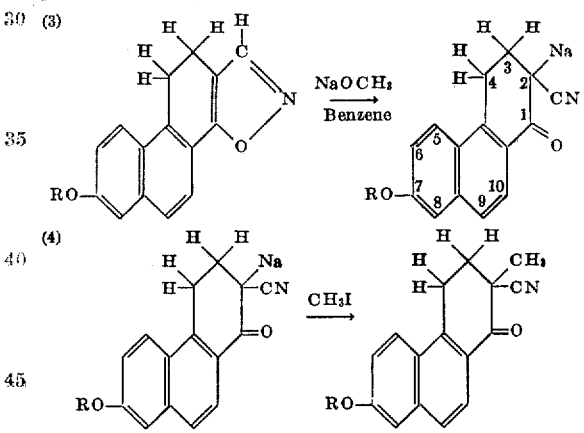

The products obtained by reactions 3 and 4 are new.

By treating the product of reaction 3 with a mineral acid, we can get a modification in which a hydrogen atom takes the place of the sodium atom; and, if desired, that modified product, after being treated with sodium methoxide, may be used as the starting point for reaction 4.

*d.* The 2-cyano-1-keto-7-OR-2-methyl-1,2,3,4-tetrahydrophenanthrene is condensed with a di-lower-alkyl succinate, preferably dimethyl succinate, in the presence of an alkali-metal tertiary-lower-alkoxide, conveniently potassium tertiary-butoxide; preferably followed by treatment with a mineral acid, for instance hydrochloric acid; to produce a 15-carboalkoxy-14,15-dehydroequilenin ether; and the product so obtained is hydrolyzed, desirably with barium hydroxide followed by hydrochloric acid, to give the free acid, a 15-carboxy-dehydroequilenin ether.

The products so obtained are new.

*e.* This free acid, 15-carboxy-dehydroequilenin ether, is decarboxylated by heating under reduced pressure; to produce a mixture of two isomeric dehydroequilenin ethers. The isomers probably differ by having a double bond in the 14,15-position on the one hand and in the 15,16-position on the other. This product, with or without separating its component isomers, is hydrogenated, desirably over a palladium-charcoal catalyst, to produce two compounds, one of which is a racemic equilenin ether and the other of which is a racemic isoequilenin ether. The two compounds so produced are stereoisomers in each case. These two compounds are separated, as by fractional crystallization. In the case where R is methyl, the separated compounds are demethylated, by known methods, to obtain respectively d,l-equilenin and d,l-isoequilenin. The d,l-equilenin is resolved, by known methods, to obtain d-equilenin, which is found to be identical with natural equilenin.

The following is an example of the process of the present application, and the products obtained thereby—obtained by the first of the five steps of the complete steroid synthesis. The melting points given are all corrected for stem exposure.

*Example.—The preparation of 1-keto-2-hydroxymethylene - 7-methoxy-1,2,3,4-tetrahydrophenanthrene, useful for preparing equilenin*

To a suspension of powdered sodium methoxide (prepared by dissolving 3.39 g. of sodium in methanol, removing excess methanol by evaporation under reduced pressure, and heating at approximately 200° C. for one hour under high vacuum) in 70 cc. of dry benzene, is added 10.90 g. of ethyl formate; after which is added a solution of 16.54 g. of 1-ketone-7-methoxyl-1,2,3,4-tetrahydrophenanthrene in 110 cc. of benzene. The system containing the mixture is evacuated; and then filled with nitrogen, and allowed to stand at room temperature for about 5 hours, with occasional swirling. A copious yellow precipitate is formed. This precipitate is dissolved by shaking with ether and ice water, and then allowing the whole to separate into two layers.

The water layer, which contains the 1-ketone-7-hydroxymethylene - 7 - methoxy-1,2,3,4-tetrahydrophenanthrene in the form of the sodio derivative, is separated from the ether layer and preserved; and for complete recovery the ether layer is desirably washed thoroughly with water and with dilute potassium hydroxide solution and the washings added to the separated aqueous layer. The combined aqueous solution is then acidified, to cause separation of the 1-keto-2-hydroxymethylene - 7 - methoxy-1,2,3,4-tetrahydroxyphenanthrene, as yellow crystals. As first obtained, these give a yield of about 17.73 g. (or 95%), melting at about 130–131.5° C.; which is of satisfactory purity for the next step. The crystals may be purified if desired, as by recrystallization several times with alcohol; but the melting point is not materially changed, although somewhat sharpened, for the crystallized crystals have a melting point of 130–130.6° C.

Analysis shows the following: Calculated for $C_{16}H_{14}O_3$: C, 75.57%; H, 5.55%. Found: C, 75.37%; H, 5.68%.

The yellow crystalline 1-keto-2-hydroxymethylene - 7 - methoxy - 1,2,3,4 - tetrahydrophenanthrene thus obtained is used as the starting point for the remaining four steps of the complete synthesis; which are outlined in the general description given above and are set forth in detail in the four companion applications respectively, and which lead to the production of equilenin.

We claim as our invention:

1. A 1-keto-2-hydroxymethylene-7-OR-1,2,3,4-tetrahydrophenanthrene, in which R is a member of the class consisting of lower-alkyl groups and lower-aralkyl groups.

2. 1 - keto - 2 - hydroxymethylene-7-methoxy-1,2,3,4-tetrahydrophenanthrene.

3. 1 - keto - 2 - hydroxymethylene-7-lower-alkoxy-1,2,3,4-tetrahydrophenanthrene.

WILLIAM S. JOHNSON.
JACK W. PETERSEN.
CARL DAVID GUTSCHE.

REFERENCES CITED

The following references are of record in the file of this patent:

Billeter et al.: Helv. Chim. Acta, vol. 29, pages 859–871, June 15, 1946.

Cooke et al.: J. Chem. Soc., 1945 volume, pages 395–399.

Robinson et al.: J. Chem. Soc., 1938, volume, pages 183–188.

Meyer et al.: Pharm. Acta Helv., vol. 19, pages 128–151 (1944).

Griffing et al.: Journal of Organic Chemistry, vol. 11, pages 123–135, March 1946.